United States Patent
Batista et al.

(10) Patent No.: US 10,925,316 B2
(45) Date of Patent: Feb. 23, 2021

(54) ELECTRICAL AEROSOL GENERATING SYSTEM

(71) Applicant: Philip Morris Products S.A., Neuchatel (CH)

(72) Inventors: Rui Nuno Batista, Morges (CH); Stephane Antony Hedarchet, Pully (CH)

(73) Assignee: Philip Morris Products S.A., Neuchatel (CH)

( * ) Notice: Subject to any disclaimer, the term of this patent is extended or adjusted under 35 U.S.C. 154(b) by 460 days.

(21) Appl. No.: 15/577,932

(22) PCT Filed: May 26, 2016

(86) PCT No.: PCT/EP2016/061952
§ 371 (c)(1),
(2) Date: Nov. 29, 2017

(87) PCT Pub. No.: WO2016/198266
PCT Pub. Date: Dec. 15, 2016

(65) Prior Publication Data
US 2018/0160734 A1    Jun. 14, 2018

(30) Foreign Application Priority Data
Jun. 10, 2015  (EP) .................................... 15171536

(51) Int. Cl.
*A24F 47/00* (2020.01)
*G05B 11/01* (2006.01)
*G06K 9/00* (2006.01)

(52) U.S. Cl.
CPC ............ *A24F 47/008* (2013.01); *G05B 11/01* (2013.01); *G06K 9/00087* (2013.01)

(58) Field of Classification Search
None
See application file for complete search history.

(56) References Cited

U.S. PATENT DOCUMENTS

| 8,820,330 B2 | 9/2014 | Bellinger et al. |
| 8,851,068 B2 | 10/2014 | Cohen et al. |

(Continued)

FOREIGN PATENT DOCUMENTS

| CN | 101667234 A | 3/2010 |
| CN | 101809581 A | 8/2010 |

(Continued)

OTHER PUBLICATIONS

International Search Report and Written Opinion dated Sep. 5, 2016 in PCT/EP2016/061952, filed May 26, 2016.

(Continued)

*Primary Examiner* — Thor S Campbell
(74) *Attorney, Agent, or Firm* — Oblon, McClelland, Maier & Neustadt, L.L.P.

(57) ABSTRACT

An aerosol-generating system is provided, including a power supply; a controller connected to the supply; an aerosol-generating element connected to the controller; and a first sensor connected to the controller to provide a first signal to the controller in response to a first user input action, the controller being responsive to the first signal to switch from an off state to a ready state in which the controller prevents at least one function of the system but is responsive to a second user input action providing a second signal to the controller, and the controller comparing the second signal with stored data and switching from the ready state to an on state if the second signal matches the stored data, and in the on state the controller is responsive to a third user input action to switch to an active state in which the controller activates the function.

20 Claims, 2 Drawing Sheets

(56) References Cited

U.S. PATENT DOCUMENTS

| | | | | |
|---|---|---|---|---|
| 9,877,505 | B2* | 1/2018 | Cameron | A24F 47/002 |
| 2005/0034723 | A1* | 2/2005 | Bennett | A61K 9/007 |
| | | | | 128/203.12 |
| 2005/0227674 | A1 | 10/2005 | Kopra et al. | |
| 2008/0038363 | A1* | 2/2008 | Zaffaroni | A61M 11/041 |
| | | | | 424/502 |
| 2009/0083847 | A1 | 3/2009 | Fadell et al. | |
| 2010/0181387 | A1* | 7/2010 | Zaffaroni | A61M 15/06 |
| | | | | 239/13 |
| 2010/0307518 | A1 | 12/2010 | Wang | |
| 2011/0265806 | A1 | 11/2011 | Alarcon et al. | |
| 2012/0048266 | A1 | 3/2012 | Alelov | |
| 2012/0111347 | A1 | 5/2012 | Hon | |
| 2012/0227752 | A1 | 9/2012 | Alelov | |
| 2012/0318266 | A1 | 12/2012 | Chou | |
| 2013/0220315 | A1* | 8/2013 | Conley | A24F 47/008 |
| | | | | 128/202.21 |
| 2014/0070957 | A1 | 3/2014 | Longinotti-Buitoni et al. | |
| 2014/0096781 | A1* | 4/2014 | Sears | A24F 40/00 |
| | | | | 131/328 |
| 2014/0096782 | A1* | 4/2014 | Ampolini | A24F 47/008 |
| | | | | 131/328 |
| 2014/0224245 | A1 | 8/2014 | Alelov | |
| 2014/0224267 | A1* | 8/2014 | Levitz | A24F 47/008 |
| | | | | 131/329 |
| 2014/0246035 | A1* | 9/2014 | Minskoff | A24F 47/008 |
| | | | | 131/329 |
| 2014/0366898 | A1 | 12/2014 | Monsees et al. | |
| 2015/0020833 | A1 | 1/2015 | Conley et al. | |
| 2015/0053214 | A1 | 2/2015 | Alarcon et al. | |
| 2015/0059779 | A1 | 3/2015 | Alarcon et al. | |
| 2015/0122252 | A1 | 5/2015 | Frija | |
| 2015/0320116 | A1* | 11/2015 | Bleloch | F22B 1/281 |
| | | | | 219/628 |
| 2016/0029697 | A1* | 2/2016 | Shafer | A24F 47/008 |
| | | | | 131/328 |
| 2016/0150828 | A1* | 6/2016 | Goldstein | A24F 47/008 |
| | | | | 392/387 |
| 2016/0158782 | A1* | 6/2016 | Henry, Jr. | B05B 12/08 |
| | | | | 700/275 |
| 2016/0166564 | A1* | 6/2016 | Myers | A61M 15/0081 |
| | | | | 514/343 |
| 2016/0331035 | A1* | 11/2016 | Cameron | F01K 5/00 |
| 2016/0363917 | A1* | 12/2016 | Blackley | G05B 19/042 |
| 2017/0251719 | A1* | 9/2017 | Cyphert | A24F 1/00 |
| 2017/0360114 | A1* | 12/2017 | Memari | A24F 15/12 |
| 2018/0070639 | A1* | 3/2018 | Chen | H05B 6/105 |
| 2018/0184712 | A1* | 7/2018 | Fraser | A24F 47/008 |
| 2018/0184722 | A1* | 7/2018 | Murison | A61M 15/06 |
| 2018/0192700 | A1* | 7/2018 | Fraser | A24F 47/008 |
| 2019/0124979 | A1* | 5/2019 | Sebastian | H05B 1/0227 |
| 2019/0200677 | A1* | 7/2019 | Chong | A24D 1/02 |
| 2019/0230987 | A1* | 8/2019 | Wu | A24F 47/008 |
| 2019/0357598 | A1* | 11/2019 | Qiu | A61B 5/1118 |
| 2020/0057882 | A1* | 2/2020 | Ouyang | G06K 9/00228 |

FOREIGN PATENT DOCUMENTS

| | | |
|---|---|---|
| CN | 102866843 A | 1/2013 |
| CN | 103948177 A | 7/2014 |
| CN | 104010539 A | 8/2014 |
| CN | 203851811 U | 10/2014 |
| CN | 104432537 A | 3/2015 |
| CN | 102940313 B | 4/2015 |
| CN | 204275207 U | 4/2015 |
| CN | 204742634 U | 11/2015 |
| EP | 2 921 064 A1 | 9/2015 |
| EP | 2 756 860 B1 | 9/2016 |
| EP | 3 120 720 A1 | 1/2017 |
| JP | 2014-519850 | 8/2014 |
| JP | 2014-524313 A | 9/2014 |
| KR | 10-1277175 B1 | 6/2013 |
| WO | WO 2014/150704 A2 | 9/2014 |

OTHER PUBLICATIONS

Combined Chinese Office Action and Search Report dated Jan. 3, 2020, in Patent Application No. 201680029534.4 (with English translation), citing documents AO-AS therein, 22 pages.

European Office Action dated Feb. 4, 2019 in Patent Application No. 16 727 973.6, citing documents AA, AB, AO and AP therein, 5 pages.

"Dovpo 30W E-cigarette e-mech MOD better than DNA30", https://web.archive.org/web/20141004085809/http://www.dovpoecig.com:80/dovpo-e-mech-electroniccigarette-factory.html, Archived Oct. 4, 2014, 3 pages.

"Cigarette electronique automatique e-Noted slim, déclenchement à l'aspiration", https://web.archive.org/web/20140825103908/http://www.spotysmoke.fr/cigarettes-electroniques/cigarette-electronique-automatique-e-noted-slim-declenchement-a-l-aspiration-129.html, Archived Aug. 25, 2014, 7 pages.

Japanese Office Action dated Jul. 20, 2020 in corresponding Japanese Patent Application No. 2017-563616 (with English translation), citing documents AO-AP therein, 11 pages.

Second Chinese Office Action dated Sep. 25, 2020 in corresponding Chinese Patent Application No. 201680029534.4 (with English translation), 12 pages.

* cited by examiner

ELECTRICAL AEROSOL GENERATING SYSTEM

The invention relates to electrically operated aerosol generating systems, such as electrically operated smoking systems, and in particular to user interfaces for electrically operated aerosol generating systems.

There are several different types of electrically operated smoking systems. Electrically operated smoking systems are typically handheld systems, but come in various shapes and sizes. Some heat a liquid to form a flavoured aerosol and others heat for example tobacco-containing plugs or loose leaf tobacco to form an aerosol. However, most currently available electrically operated smoking systems have a simple on/off functionality. For example, when a button is pressed to switch the system on, a heater is turned on to start a heating process or an airflow sensor is activated to allow for detection of a user puffing on the system, with a heater or other aerosol-generating component activated when a user puff is detected.

While examples of these arrangements can be simple and relatively inexpensive to implement, it would be desirable to provide an alternative user interface that is attractive to the user or can provide for greater flexibility or security for the operation of the system.

In a first aspect of the invention, there is provided an aerosol-generating system comprising:

a power supply, a controller connected to the power supply, and an aerosol-generating element connected to the controller, a first sensor connected to the controller and configured to provide a first signal to the controller in response to a first user input action, wherein the controller is responsive to the first signal to switch from an off state to a ready state, wherein in the ready state the controller prevents at least one function of the aerosol-generating system but is responsive to a second user input action providing a second signal to the controller, wherein the controller is configured to compare the second signal with stored data and to switch from the ready state to an on state if the second signal matches the stored data, and wherein, in the on state, the controller is responsive to a third user input action to switch to an active state in which the controller activates the at least one function of the aerosol-generating system.

The at least one function of the aerosol-generating system may be supplying power from the power supply to the aerosol-generating element. In this way, the generation of aerosol by the system is prevented until the user is authenticated by the second user input action and a subsequent third user input action is performed. Unauthorised users are prevented from operating the system to generate aerosol. And the system has different functional states beyond simply being on or off.

Alternatively, or in addition, the at least one function of the aerosol-generating system may be to provide access to stored information, such as usage statistics, or to provide access to a user interface that allows a user to configure operational preferences for the system.

The stored data may configurable by a user. During a set-up operation, a user may provide the data that is to form the stored data in the form of a fingerprint, a passcode, a voice signature or a sequence of movements or gestures. In this way, the system allows for a user configurable authentication step.

The system may comprise a second sensor connected to the controller, the second sensor providing a second signal to the controller in response to the second user action.

The first sensor may be for example an accelerometer, airflow sensor, gyroscope or a microphone. These sensors provide the ability to switch the system to a ready state without the need for a mechanical button. This advantageous for aesthetic, ergonomic and reliability reasons and for ease of manufacture. The first sensor may be a mechanical interface such as a button.

The second sensor may be a microphone, a fingerprint sensor, an airflow sensor, an accelerometer or a gyroscope. The second sensor may comprise a touch screen or a key pad. Again, the absence of a mechanical button is an advantage in some examples.

The first user input action may comprise a sequence of user actions. For example, if the first sensor is an accelerometer, the first user input action may be a sequence of shakes of the system. By requiring a sequence of user actions to switch the state of the system, accidental switching can be significantly reduced.

The system may further comprise a first indicator connected to the controller, the controller being configured to activate the indicator when the system is in a ready state. The first indicator may indicate the position of the second sensor. This is useful for example if the second sensor is a touch activated sensor or a fingerprint scanner.

The system may comprise a second indicator connected to the controller, the controller being configured to activate the second indicator when the system is in the on state. Alternatively, the first indicator may be used to indicate when the system is in the on state by providing a different indication for the on state than it provides for the ready state.

The system may be configured to have a different appearance in each of the off, ready, on and active states. For example different coloured LEDs may be activated in each of the states.

The system may comprise a third sensor connected to the controller, the third sensor providing a third input signal to the controller in response to the third user input action, the controller being configured to activate the at least one function of the aerosol-generating system in response to the third input signal.

The third sensor may be a capacitive touch sensor or an airflow sensor. For example, the at least one function of the aerosol-generating system may be supplying power from the power supply to the aerosol-generating element to generate an aerosol. The third sensor may be a capacitive sensor in a mouthpiece of the system and may sense a user placing their mouth on the mouthpiece. The third sensor may be an airflow sensor configured to sense an airflow through an air path within the system, indicative of a user puffing on the system. The third sensor may be a touch screen, or a key pad, or may be an electrical sensor configured to detect the connection of an external device to the system.

The system may comprise a non-volatile memory for storing user data. The memory may store a plurality of user data sets associated with a plurality of different users or user profiles. The controller may be configured to compare the second signal with the user data set, and only if the second signal matches one of the data sets, switch the system from the ready state to an on state. The on state may be particular to the user data set matching the second signal, so that a particular user's setting are used during operation of the system.

Different users may be permitted to user different functions of the system. For example, a secondary user may be permitted to use the system to generate aerosol. But a primary user, such as the registered owner, may be the only user permitted to access stored usage data or to alter system settings. By storing different user data sets within the system different users may be authenticated to allow different functions of the system to be accessed.

The controller may be configured to switch the system from the ready state to the off state if the second user input action is not performed within a first time period. Similarly, the controller may be configured to switch the system from the on state to the off state if the third user input action is not performed within a second time period. And the controller may be configured to switch the system from the active state to the on state if third user input action is stopped.

The system preferably comprises a mouthpiece. As used herein, the term "mouthpiece" preferably refers to a portion of an aerosol-generating system that is placed into a user's mouth in order to directly inhale an aerosol generated by the aerosol-generating system.

The aerosol-generating system may comprise different parts that are assembled together in use. For example, a main body of the system may comprise the controller and the power supply, and a consumable portion may comprise the aerosol-generating element. Alternatively, a main body of the system may comprise the controller and the power supply, the aerosol-generating element, and a consumable portion may comprise an supply of aerosol-forming substrate. The mouthpiece may form part of a main body of the system or part of a consumable portion.

The aerosol-forming element may be a heater configured to heat an aerosol-forming substrate held in the system. The aerosol-forming element may be a piezoelectric transducer.

The heater may comprise at least one heating element. The heater may comprise more than one heating element, for example two, or three, or four, or five, or six or more heating elements. The heating element or heating elements may be arranged appropriately so as to most effectively heat the aerosol-forming substrate.

The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colo. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company, 1007 Market Street, Wilmington, Del. 19898, United States of America.

The at least one electric heating element may comprise an infra-red heating element, a photonic source, or an inductive heating element.

The at least one electric heating element may take any suitable form. For example, the at least one electric heating element may take the form of a heating blade. The at least one electric heating element may take the form of a casing or substrate having different electro-conductive portions, or an electrically resistive metallic tube. If the aerosol-forming substrate is a liquid provided within a container, the container may incorporate a disposable heating element. One or more heating needles or rods that run through the centre of the aerosol-forming substrate may be used. The at least one electric heating element may be a disk (end) heating element or a combination of a disk heating element with heating needles or rods. The at least one electric heating element may comprise a flexible sheet of material arranged to surround or partially surround the aerosol-forming substrate. Other possibilities include a heating wire or filament, for example a Ni—Cr, platinum, tungsten or alloy wire, or a heating plate. Optionally, the heating element may be deposited in or on a rigid carrier material.

The at least one electric heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable heat storage materials include silica gel, alumina, carbon, glass mat, glass fibre, minerals, a metal or alloy such as aluminium, silver or lead, and a cellulose material such as paper. Other materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-forming substrate and can transfer the stored heat directly to the substrate. The heat stored in the heat sink or heat reservoir may be transferred to the aerosol-forming substrate by means of a heat conductor, such as a metallic tube.

The at least one heating element may heat the aerosol-forming substrate by conduction. The heating element may be at least partially in contact with the substrate, or the carrier on which the substrate is deposited. The heat from the heating element may be conducted to the substrate by a heat conductive element.

The at least one heating element may transfer heat to the incoming ambient air that is drawn through the electrically heated aerosol generating system during use, which in turn heats the aerosol-forming substrate by convection. The ambient air may be heated before passing through the aerosol-forming substrate. If the aerosol-forming substrate is a liquid substrate, the ambient air may be first drawn through the substrate and then heated.

The aerosol-forming substrate may be a solid aerosol-forming substrate. The aerosol-forming substrate preferably comprises a tobacco-containing material containing volatile tobacco flavour compounds which are released from the substrate upon heating. The aerosol-forming substrate may comprise a non-tobacco material. The aerosol-forming substrate may comprise tobacco-containing material and non-tobacco containing material. Preferably, the aerosol-forming substrate further comprises an aerosol former. Examples of suitable aerosol formers are glycerine and propylene glycol.

The aerosol-forming substrate may be a liquid aerosol-forming substrate. The electrically heated aerosol generating system may further comprise a liquid storage portion. Preferably, the liquid aerosol-forming substrate is stored in the liquid storage portion. The electrically heated aerosol generating system may further comprise a capillary wick in communication with the liquid storage portion. It is also possible for a capillary wick for holding liquid to be provided without a liquid storage portion. In that case, the capillary wick may be preloaded with liquid.

Preferably, the capillary wick is arranged to be in contact with liquid in the liquid storage portion. In that case, in use, liquid is transferred from the liquid storage portion towards the at least one electric heating element by capillary action in the capillary wick. In one embodiment, the capillary wick extends into the liquid storage portion. When the heating element is activated, liquid in the capillary wick is vaporized by the heating element to form the supersaturated vapour. The supersaturated vapour is mixed with and carried in the airflow. During the flow, the vapour condenses to form the aerosol and the aerosol is carried towards the mouth of a user. The heating element in combination with a capillary wick may provide a fast response, because that arrangement may provide a high surface area of liquid to the heating element. Control of the heating element according to the invention may therefore depend on the structure of the capillary wick or other heating arrangement.

The liquid substrate may be absorbed into a porous carrier material, which may be made from any suitable absorbent plug or body, for example, a foamed metal or plastics material, polypropylene, terylene, nylon fibres or ceramic. The liquid substrate may be retained in the porous carrier material prior to use of the electrically heated aerosol generating system. or, The liquid substrate material may be released into the porous carrier material during, or immediately prior to use.

If the aerosol-forming substrate is a liquid substrate, the liquid has physical properties. These include, for example, a boiling point, vapour pressure, and surface tension characteristics to make them suitable for use in the aerosol generating system. Control of the at least one electric heating element may depend upon the physical properties of the liquid substrate, such as the boiling point, vapour pressure, and surface tension. The liquid preferably comprises a tobacco-containing material comprising volatile tobacco flavour compounds which are released from the liquid upon heating. Alternatively, or in addition, the liquid may comprise a non-tobacco material. The liquid may include water, solvents, ethanol, plant extracts and natural or artificial flavours. Preferably, the liquid further comprises an aerosol former. Examples of suitable aerosol formers are glycerine and propylene glycol.

An advantage of providing a liquid storage portion is that a high level of hygiene can be maintained. Using a capillary wick extending between the liquid and the electric heating element, allows the structure of the system to be relatively simple. The liquid has physical properties, including viscosity and surface tension, which allow the liquid to be transported through the capillary wick by capillary action. The liquid storage portion is preferably a container. The liquid storage portion may not be refillable. Thus, when the liquid in the liquid storage portion has been used up, the aerosol generating system is replaced. The liquid storage portion may be refillable. In that case, the aerosol generating system may be replaced after a certain number of refills of the liquid storage portion. Preferably, the liquid storage portion is arranged to hold liquid for a pre-determined number of puffs.

The capillary wick may have a fibrous or spongy structure. The capillary wick preferably comprises a bundle of capillaries. For example, the capillary wick may comprise a plurality of fibres or threads, or other fine bore tubes. The fibres or threads may be generally aligned in the longitudinal direction of the aerosol generating system. The capillary wick may comprise sponge-like or foam-like material formed into a rod shape. The rod shape may extend along the longitudinal direction of the aerosol generating system. The structure of the wick forms a plurality of small bores or tubes, through which the liquid can be transported to the electric heating element, by capillary action. The capillary wick may comprise any suitable material or combination of materials. Examples of suitable materials are ceramic- or graphite-based materials in the form of fibres or sintered powders. The capillary wick may have any suitable capillarity and porosity so as to be used with different liquid physical properties such as density, viscosity, surface tension and vapour pressure. The capillary properties of the wick, combined with the properties of the liquid, ensure that the wick is always wet in the heating area.

The aerosol-forming substrate may be any other sort of substrate, for example, a gas substrate, or any combination of the various types of substrate. During operation, the substrate may be completely contained within the electrically heated aerosol generating system. In that case, a user may puff on a mouthpiece of the electrically heated aerosol generating system. During operation, the substrate may be partially contained within the electrically heated aerosol generating system. In that case, the substrate may form part of a separate article and the user may puff directly on the separate article.

The electrically operated aerosol generating system may comprise an aerosol-forming chamber in which aerosol forms from a super saturated vapour, which aerosol is then carried into the mouth of a user. An air inlet, air outlet and the chamber are preferably arranged so as to define an airflow route from the air inlet to the air outlet via the aerosol-forming chamber, so as to convey the aerosol to the air outlet and into the mouth of a user.

The first sensor may be positioned within the housing. The second and third sensors may also be positioned within the housing. Advantageously, the housing comprises no moving parts.

The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle. The housing may incorporate a touch sensor, screen or fingerprint sensor.

The power supply may be a battery, such as a rechargeable lithium ion battery, within a main body of the housing. As an alternative, the power supply may be another form of charge storage device such as a capacitor. The power supply may require recharging and may have a capacity that allows for the storage of enough energy for one or more smoking experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of a heating element.

Preferably, the aerosol generating system is portable. The aerosol generating system may be a smoking system and may have a size comparable to a conventional cigar or cigarette. The smoking system may have a total length between approximately 30 mm and approximately 150 mm. The smoking system may have an external diameter between approximately 5 mm and approximately 30 mm.

In a second aspect of the invention, there is provided a method of activating an aerosol-generating system, comprising:

in an off state of the aerosol-generating system, detecting a first input user action, switching the aerosol-generating system from the off state to a ready state in response to the first user action;

in the ready state, detecting a second user input action, comparing the second user input action with authentication data stored in a memory of the aerosol-generating system, and if the second user input action matches the authentication data, switching the aerosol-generating system from the ready state to an on state; and in the on state, detecting a third user input action and in response to the third user input action, switching the system from the on state to an active state in which power is supplied to an aerosol-generating element or another function of the aerosol-generating system is activated.

The first, second and third user input actions may be as described with reference to the first aspect of the invention.

The authentication data stored in the memory may comprise data associated with a plurality of different users or user profiles.

The method may comprise providing an indication of the state of the system. The method may comprise providing a different appearance for the system in each of the off, ready, on and active states.

The method may comprise switching the system from the ready state to the off state if the second user input action is not performed within a first time period. Similarly, the method may comprise switching the system from the on state to the off state if the third user input action is not performed within a second time period. And the method may comprise switching the system from the active state to the on state if third user input action is stopped.

In a third aspect of the invention, there is provided a controller for an aerosol-generating system comprising a power supply for connection to the controller and an aerosol generating element, wherein the controller:

is configured to receive a first signal from a first sensor in response to a first user input action, and is responsive to the first signal to switch from an off state to a ready state, wherein in the ready state the controller prevents at least one function of the aerosol-generating system but is responsive to a second user input action providing a second signal to the controller, and is configured to compare the second signal with stored data and to switch from the ready state to an on state if the second signal matches the stored data, and wherein, in the on state, the controller is responsive to a third user input action to switch to an active state in which the controller activates the at least one function of the aerosol-generating system.

Features described in relation to one aspect of the invention may be applied to other aspects of the invention.

Embodiments of the invention will now be described in detail, by way of example only, with reference to the accompanying drawings, in which.

Figure 1:
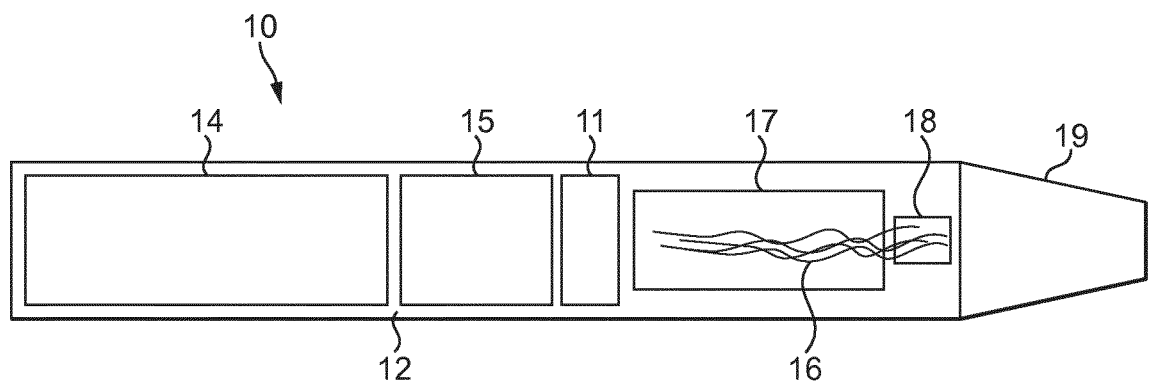
FIG. 1 is a schematic illustration of the basic components of an electrically operated smoking system in accordance with the invention.

FIG. 1 is a schematic illustration of an electrically operated smoking system 10 showing the basic components. The system comprises a housing 12, containing a power supply in the form of a battery 14, a user interface 11, a controller comprising electric circuitry 15, a supply of aerosol-forming substrate 17, and an atomiser 18, which in this example is a heater. In this example the aerosol-forming substrate is a liquid and the system comprises a wick to convey the liquid to the atomiser 18. The housing includes a mouthpiece 20. In use, when the system is activated, a user puffs on the mouthpiece to draw air through the system. As the air is drawn through the system heater vapourises the liquid substrate and an aerosol is formed. The aerosol is drawn into the user's mouth through the mouthpiece.

Figure 2:
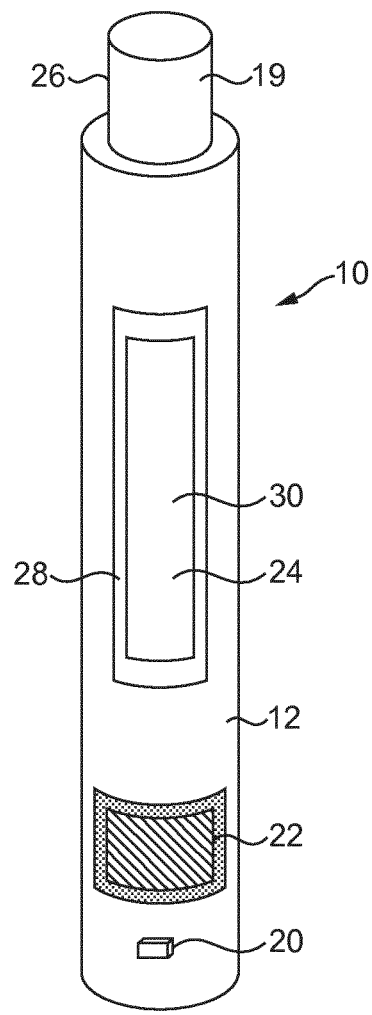
FIG. 2 is a schematic side view of an electrically operated smoking system in accordance with the invention.
Figure 3:
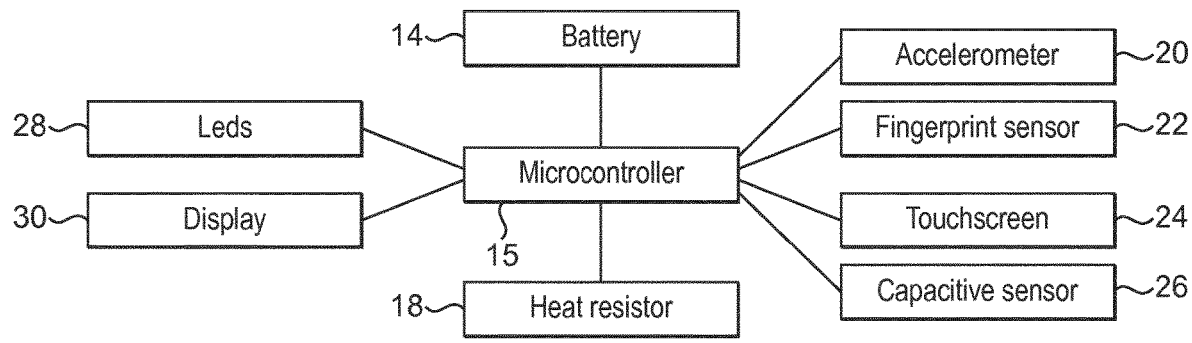
FIG. 3 is an illustration of the electrical components of the system shown in FIG. 2.

FIG. 2 is a schematic view of an electrically operated smoking system having the basic components shown in FIG. 1. The user interface of the system of FIG. 2 comprises several different component parts. The system of FIG. 2 comprises an accelerometer 20, a fingerprint scanner 22, touchscreen sensor 24 overlying a display 30, an array of LED indicators 28 and a capacitive sensor 26 on the outside surface of the mouthpiece 19. Each of these components is connected to the controller 15, as illustrated in FIG. 3, which is a schematic illustration of the electrical components of the system.

The system illustrated in FIG. 2 has no mechanical buttons. The outer surface of the system is smooth. The accelerometer 20 is shown in FIG. 2, but is positioned inside the housing of the system. A smooth outer surface is both aesthetically and ergonomically pleasing but also ensures that dirt and smoke deposits cannot enter the interior of the system and so improves hygiene and reliability.

Figure 4:
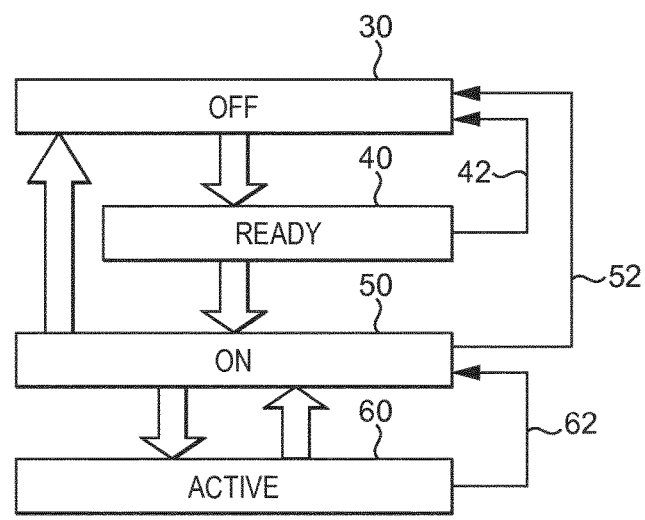
FIG. 4 is an illustration of the possible states of the system shown in FIG. 2.

One possible manner of operation of the system illustrated in FIGS. 2 and 3 will now be described with reference to FIG. 4.

The system is initially in an off state 30. In the off state the controller 15 is responsive only to signals from the accelerometer. Power is not supplied to the heater 18 and the fingerprint sensor 22, touchscreen 24 and capacitive sensor 26 cannot be used. None of the LEDS are on and the display is off.

The user then shakes the system up and down three times. This is a first user input action. The accelerometer produces a first input signal as a result of the shaking of the system and this first input signal is received by the controller 15 and compared to data stored in a memory of the controller. If the first input signal matches the data stored in memory, then the controller switches to a ready state 40.

In the ready state some of the LEDs 28 are illuminated. In this example LEDs surrounding the fingerprint sensor 22 may be illuminated to indicated that the system in the ready state and to indicate the position of the fingerprint sensor. In the ready state the controller is responsive to signals from the fingerprint sensor 22, but the touchscreen 24 and capacitive sensor 26 cannot be used. Signals from the accelerometer 20 are also ignored by the controller in the ready state.

To transition from a ready state to an on state, the user must place their finger on the fingerprint sensor 22. If the user does not place their finger on the fingerprint sensor within 5 seconds of the controller switching from the off state to the ready state, then the controller returns to the off state. This is illustrated by arrow 42.

When the user places their finger on the fingerprint sensor 22, the fingerprint sensor provides a second input signal to the controller 18 that is based on the user's fingerprint. The controller compares the second input signal to stored fingerprint data. If the second input signal matches the fingerprint data stored in memory, then the controller switches to a on state 50.

The fingerprint data stored in memory must be provided by the user during a set-up procedure before first use of the system. In this way the system can be configured to perform an authentication check, based on the user's fingerprint, to ensure that only that user can use the system. The system can be configured to operate for a different user by performing the set-up procedure again and providing a different user's fingerprint as stored data. In some embodiments, in may be possible to stored a plurality of different user fingerprints so that different users can use the system without having to reconfigure the system, as will be described.

In the on state a different set of the LEDs 28 are illuminated. In this example LEDs surrounding the touchscreen 24 may be illuminated to indicated that the system in the on state and to indicate the position of the touchscreen. In the on state the display is illuminated and shows user options and the controller is responsive to signals from the touchscreen 22 to select one of those options. The options may include: "smoke", "configure user settings", "see usage data", "check battery and liquid levels" and "switch off". If the "switch off" option is selected the system returns to the off state. Signals from the accelerometer 20 and fingerprint sensor are ignored by the controller in the on state.

To transition from an on state to an active state in which the heater is activated, the user must select an option using the touchscreen and then activate the heater by placing their mouth on the mouthpiece 19. The capacitive sensor 26 provides an input signal in response to the contact of the user's mouth with the mouthpiece 19. In response to the input signal from the capacitive sensor, the controller supplies power to the heater 18 from the battery 14 and the heater vapourises the liquid in the wick 16 to produce an aerosol. A different sub-set of the LEDs may be illuminated to indicate that the system is producing aerosol. The use of a capacitive sensor to activate the heater provides users with a similar experience to smoking a conventional cigarette and ensures that the activation starts before the user draws air through the system, reducing the possibility of liquid inhalation.

If the user does not select an option using the touchscreen within 10 seconds of the controller switching from the ready state to the on state, then the controller returns to the off state. This is illustrated by arrow 52.

The system may be in active state that does not involve supplying power to the heater. For example, if the user selects the "configure user settings" option, then the system will display user settings options on the display screen and may still be considered to be in an active state and will not automatically switch to an off state after 10 seconds.

The system may switch from the active state back to the off state based on a user action or based on a time out counter. For example, when a user removes their mouth from the mouthpiece the signal from the capacitive sensor changes and that may trigger the controller to switch back to an on state. The controller may also be configured to limit the amount of time that the system can be in an active state supplying power to the heater in order to prevent overheating. The heater may be on for no more than 5 seconds for example. After 5 seconds the controller may automatically switch back to the on state, as illustrated by arrow 62.

Different time limits may be provided for different active states. For example, if the "see usage data" option has been selected the system may automatically return to the on state after 30 seconds if not further user input is detected.

As previously described, the system may allow for different user authentication data, such as fingerprint data to be stored to allow access to the system functions to be restricted to more than one user. In addition, it may be desirable to allow different users to be allowed to access different functions of the system. For example, if the system is being used as a medicament delivery system or as a smoking cessation system, it may be desirable for only a medical practitioner to have access to some of the system settings so that they can set usage limits on the system. The controller may be configured to store different user profiles associated with different user authentication data so that, depending on the authentication data, e.g. fingerprint, provided, different user options are made available on the display and touchscreen.

A system as described has several benefits over aerosol-generating systems currently available on the market. The requirement for user authentication before the system can be placed in an on state provides for greater security than simple button or airflow activated systems. The requirement for an initial user action prior to authentication prevents accidental activation of the system and provides for additional security and reduced power consumption. The absence of mechanical buttons means that the system can be manufactured simply and provides for an attractive appearance for the system.

The system also provides for a richer user interface that current systems. And the use of an authentication step before the system is in an on state allows for customisation of the user interface for different users.

The invention claimed is:

1. An aerosol-generating system, comprising:
    a power supply;
    a controller connected to the power supply;
    an aerosol-generating element connected to the controller;
    a first sensor connected to the controller and configured to provide a first signal to the controller in response to a first user input action,
        wherein the controller is responsive to the first signal to switch from an off state to a ready state,
        wherein in the ready state the controller prevents at least one function of the aerosol-generating system but is responsive to a second user input action providing a second signal to the controller, and
        wherein the controller is further configured to compare the second signal with stored data and to switch from the ready state to an on state if the second signal matches the stored data, and wherein, in the on state, the controller is responsive to a third user input action to switch to an active state in which the controller activates the at least one function of the aerosol-generating system;
    an indicator connected to the controller, the controller being configured to activate the indicator when the system is in a ready state; and a second sensor connected to the controller, the second sensor providing the second signal to the controller in response to the second user input action,
wherein the indicator indicates a position of the second sensor on the aerosol-generating system.

2. The aerosol-generating system according to claim 1, wherein the at least one function of the aerosol-generating system is supplying power from the power supply to the aerosol-generating element.

3. The aerosol-generating system according to claim 1, wherein the stored data is configurable by a user.

4. The aerosol-generating system according to claim 1, further comprising a second sensor connected to the controller, the second sensor providing the second signal to the controller in response to the second user input action.

5. The aerosol-generating system according to claim 1, wherein the first sensor is an accelerometer, a gyroscope, or a microphone.

6. The aerosol-generating system according to claim 4, wherein the second sensor is a microphone, a fingerprint sensor, an accelerometer, or a gyroscope.

7. The aerosol-generating system according to claim 1, wherein the first user input action comprises a sequence of user actions.

8. The aerosol-generating system according to claim 1, further comprising a third sensor connected to the controller, the third sensor providing a third input signal to the controller in response to the third user input action.

9. The aerosol-generating system according to claim 8, wherein the third sensor is a capacitive touch sensor or an airflow sensor.

10. The aerosol-generating system according to claim 1, wherein the controller is further configured to switch the system from the ready state to the off state if the second user input action is not performed within a first time period.

11. The aerosol-generating system according to claim 1, further comprising a housing, wherein the first sensor is positioned within the housing, and wherein the housing does not comprise any moving parts.

12. The aerosol-generating system according to claim 1, further comprising a third sensor connected to the controller and configured to provide a third input signal to the controller in response to the third user action, wherein the third sensor is an electrical sensor configured to detect a connection of an external device to the system.

13. The aerosol-generating system according to claim 4, wherein the second sensor is an accelerometer or a gyroscope.

14. The aerosol-generating system according to claim 1, wherein the system is configured to have a different appearance in each of the off, ready, on, and active states.

15. The aerosol-generating system according to claim 1, wherein the indicator is configured to indicate when the system is in the on state by providing a different indication for the on state than for the ready state.

16. The aerosol-generating system according to claim 1, further comprising a second indicator connected to the controller, the controller being further configured to activate the second indicator when the system is in the on state.

17. The aerosol-generating system according to claim 1, wherein the second sensor is a touch-activated sensor.

18. The aerosol-generating system according to claim 1, wherein the controller is further configured to compare the second signal with stored data, the stored data comprising a plurality of user data sets associated with a plurality of different user profiles, and to switch from the ready state to an on state if the second signal matches one of the user data sets of the stored data, the on state being particular to the user data set matching the second signal.

19. A method of activating an aerosol-generating system, comprising:
   in an off state of the aerosol-generating system, detecting a first user input action;
   switching, by a controller, the aerosol-generating system from the off state to a ready state in response to the first user input action, the controller being responsive to a first signal in response to the first user input action, the first signal being from a first sensor connected to the controller;
   in the ready state, detecting a second user input action, comparing the second user input action with authentication data stored in a memory of the aerosol-generating system, and if the second user input action matches the authentication data, switching the aerosol-generating system from the ready state to an on state;
   in the on state, detecting a third user input action and in response to the third user input action, supplying power to an aerosol-generating element or activating another function of the aerosol-generating system;
   activating, by the controller, an indicator connected to the controller, when the system is in the ready state; and
   providing, by a second sensor connected to the controller, a second signal to the controller in response to the second user input action,
   wherein the indicator indicates a position of the second sensor on the aerosol-generating system.

20. A controller for an aerosol-generating system comprising a power supply for connection to the controller and an aerosol generating element, wherein the controller:
   is configured to receive a first signal from a first sensor in response to a first user input action, and is responsive to the first signal to switch from an off state to a ready state, wherein in the ready state the controller prevents at least one function of the aerosol-generating system but is responsive to a second user input action providing a second signal to the controller,
   is configured to compare the second signal with stored data and to switch from the ready state to an on state if the second signal matches the stored data, and wherein, in the on state, the controller is responsive to a third user input action to switch to an active state in which the controller activates the at least one function of the aerosol-generating system,
   is configured to activate an indicator connected to the controller, when the system is in the ready state, and
   is configured to receive the second signal, from a second sensor connected to the controller, in response to the second user input action,
   wherein the indicator indicates a position of the second sensor on the aerosol-generating system.

* * * * *